Dec. 1, 1936.  D. J. KRAMER  2,062,814
DRIP PAN
Filed Jan. 7, 1936  2 Sheets-Sheet 1

Inventor
D. J. Kramer

By Clarence A. O'Brien
Attorney

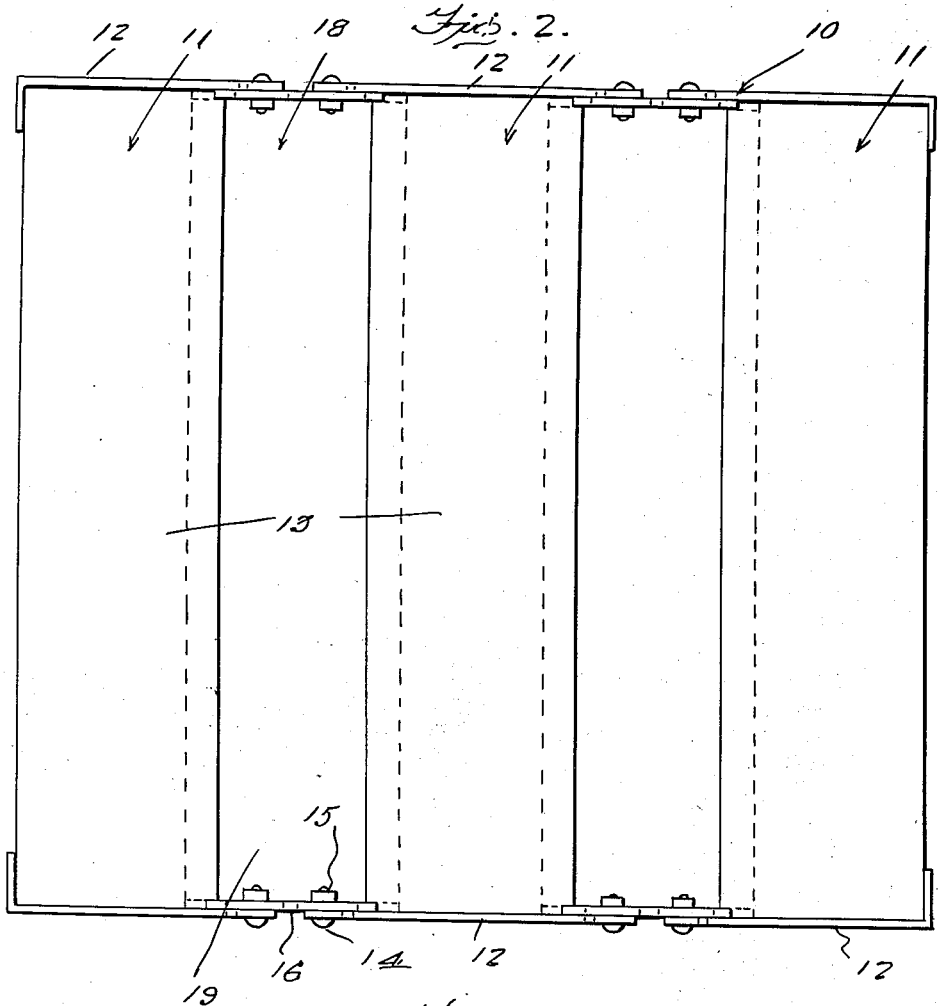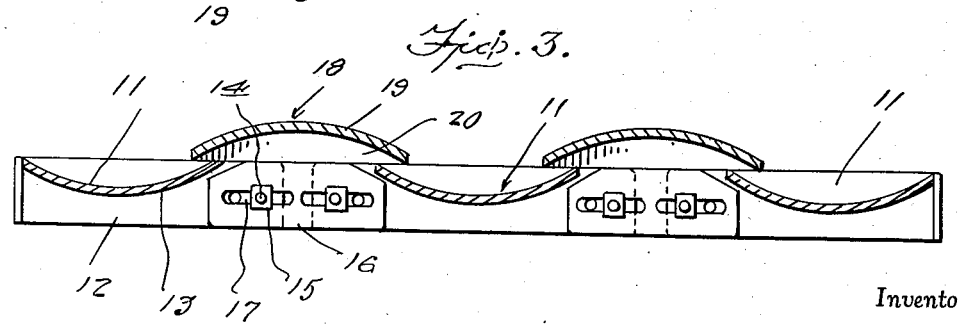

Patented Dec. 1, 1936

2,062,814

UNITED STATES PATENT OFFICE 2,062,814

DRIP PAN

Dwight J. Kramer, Hobart, Ind., assignor of one-half to Edna C. Donnelly, Hobart, Ind.

Application January 7, 1936, Serial No. 57,977

1 Claim. (Cl. 126—337)

This invention relates broadly to drip pans and the object of the invention is to provide such a pan especially adapted for use within an oven, such as the oven of a kitchen range for the purpose of catching juices from pies, pastries, meats, or the like, which might otherwise boil over into the oven; as well as to prevent such drippings from running down on the outside of the oven door.

Further, in accordance with the present invention, the drip pan is removable and can be easily cleaned.

Still further in accordance with the present invention, the drip pan is adjustable for accommodating itself to the size of the oven with which it is used.

The invention, together with its objects and advantages, will be best understood from a study of the following description taken in connection with the accompanying drawings wherein:

Figure 2 is a bottom plan view of the drip pan.

Figure 3 is a transverse sectional view through the drip pan.

Figure 1:
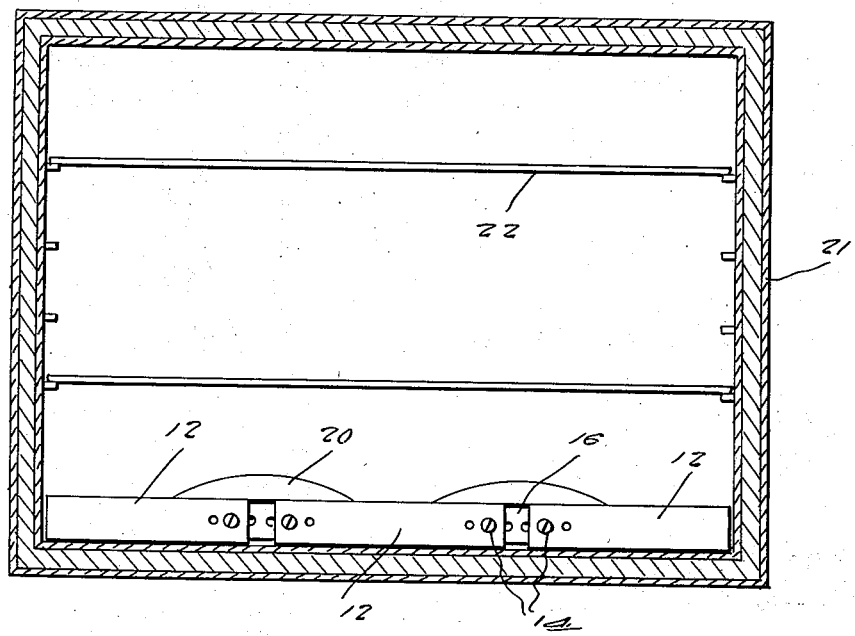
Figure 1 is a sectional view taken through an oven showing the drip pan in position therein.
Figure 4:
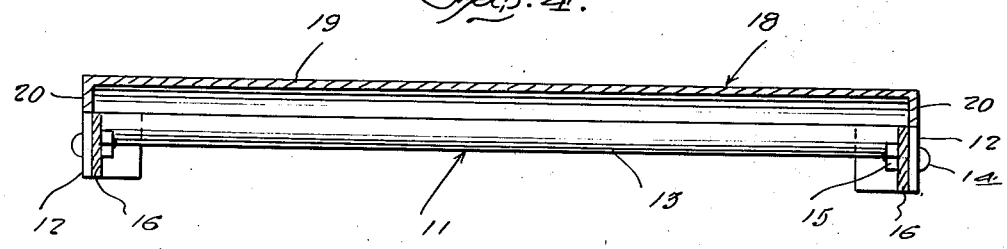
Figure 4 is a longitudinal sectional view through the drip pan.

With reference more in detail to the drawings, it will be seen that the drip pan indicated generally by the reference numeral 10 is made up of a plurality of trough sections 11, and each of these trough sections consists of end pieces 12 to which is secured the ends of a transversely curved plate 13 forming the bottom and side walls of the trough section.

Figure 5:
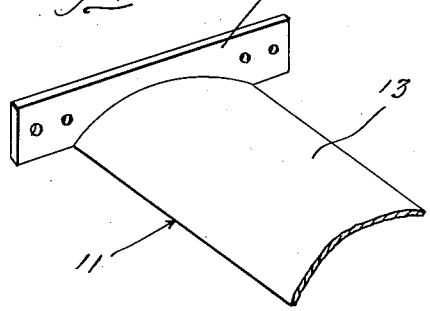
Figure 5 is a perspective view of an end portion of one of the trough sections, the same being inverted.
Figure 6:
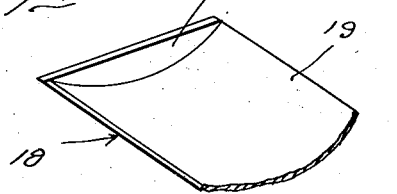
Figure 6 is a similar view of an end portion of a deflector member, the same being in an inverted position.

As clearly shown in Figure 5, the end pieces 12 project laterally of the plate 13 and the pieces 12 of the end sections 11 are bent inwardly against an adjacent longitudinal edge of the plate 13 as will be clear from a study of Figures 2 and 3.

At the opposite end thereof, the end pieces 12 of the end trough sections 11, and the end pieces 12 of the intermediate trough sections at each end thereof are provided with spaced openings for receiving bolts 14 provided with nuts 15.

Connecting plates 16 are provided for adjustably connecting the trough sections and these plates are provided with slots 17 for receiving the bolts 14 in the manner clearly shown in Figure 3. It will thus be seen that through the medium of the plates 16, the openings provided in the end pieces 12, the slots 17, bolts 14 and nuts 15, the trough sections 11 may be secured in laterally spaced relation a distance desired, and as may be required by the size of the oven in which the drip pan is placed.

For bridging the spaces between the troughs 11 and for deflecting the drippings into the troughs, there are provided deflectors 18.

Each deflector 18 consists of an elongated transversely curved plate 19 having end pieces or flanges 20, and as will be clear from a study of the drawings, the plates 19 are disposed with their convex sides upward and with the flanges 20 resting on the edges of the end members 12, the longitudinal edge portions of the plates 19 overlying the troughs 11 as shown in Figure 3 and in a manner to direct the drippings falling onto the deflectors toward either side of the deflector into one of the troughs 11.

In Figure 1 a portion of an oven is shown and indicated by the reference numeral 21. As therein shown, the drip pan 10 is placed within the oven to rest on the bottom thereof below the shelves or removable trays 22, and when so positioned, will receive the drippings or overflow of fruit or meat juices as the case may be thus protecting the bottom of the oven while at the same time the juices collecting in the troughs 11 will not seep downwardly over the outer front face of the stove or oven door to present an unsightly appearance as now often happens.

It will also be appreciated that in actual practice, the drip pan embodying the features of the present invention, by reason of its construction will tend to promote a more even distribution of heat and will in no wise tend to increase fuel consumption.

What is claimed is:

A drip pan comprising a series of arcuate troughs and deflector members arranged in overlapping relation with their concaved faces opposed and with the deflectors located relative to the troughs for directing the drippings into the troughs, flanges at each end of the respective troughs and deflectors and disposed in overlapping relation with each other and cooperating means at the overlapped ends for adjustably securing the trough and deflectors relative to each other.

DWIGHT J. KRAMER.